Sept. 26, 1939.   C. J. COBBLEY ET AL   2,174,120
SEED PLANTING MECHANISM FOR AGRICULTURAL IMPLEMENT
Filed Dec. 13, 1938   2 Sheets-Sheet 1

Inventor
C. J. Cobbley
J. R. Bone
By Robb & Robb
Attorneys

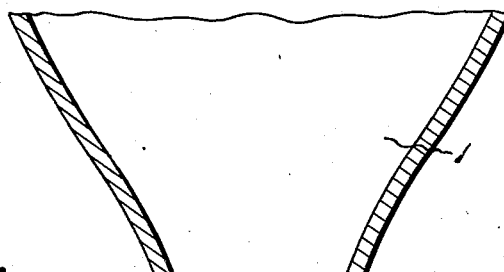
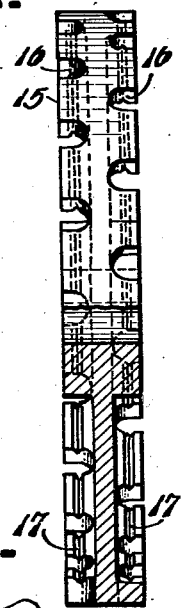
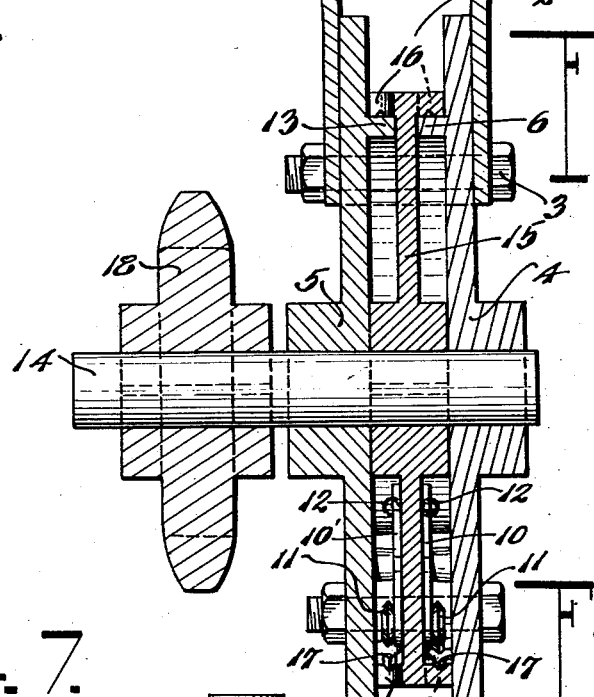
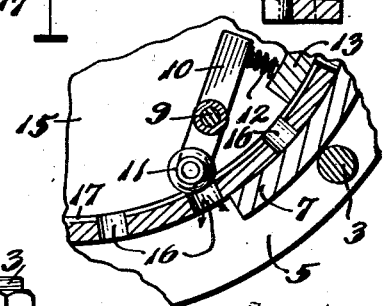
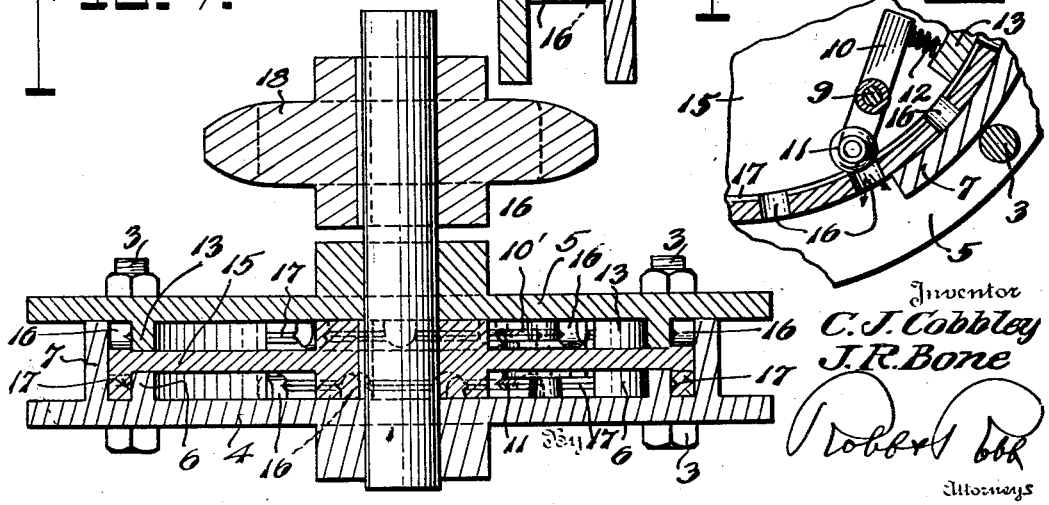

Patented Sept. 26, 1939

2,174,120

UNITED STATES PATENT OFFICE 2,174,120

SEED PLANTING MECHANISM FOR AGRICULTURAL IMPLEMENTS

Charles Joseph Cobbley, Pleasant Grove, and John Richard Bone, Lehi, Utah, assignors to Utah-Idaho Sugar Company, Salt Lake City, Utah, a corporation Application December 13, 1938, Serial No. 245,516

5 Claims. (Cl. 221—125)

The present invention relates to improvements in agricultural implements and in particular to seed planting machines.

The object of our invention is to provide a simple and efficient appliance for planting single seeds uniformly at predetermined, accurate distances apart, the planting instrumentalities of which are readily changeable so as to handle a large variety of seeds.

Other and further objects and advantages of the invention will be hereinafter set forth and the novel features thereof defined by the appended claims.

In the drawings:

Figure 5 is a vertical sectional view on the line 5—5 of Figure 1 looking in the direction of the arrows;

Figure 6 is a detail view partly in elevation and partly in section of the seed wheel;

Figure 7 is a horizontal sectional view on the line 7—7 of Figure 2; and

Figure 8 is an enlarged fragmentary sectional view, showing more clearly the mounting of one of the seed trippers in association with its race in the seed wheel.

Like reference characters designate corresponding parts in the several figures of the drawings.

The invention herein disclosed constitutes the feeding section only of a planter, it being understood that said section, or a plurality of them, is mounted upon any suitable wheeled chassis which can be drawn or propelled over the area to be planted. Preferably it is arranged or supported between the conventional shoe or furrow opener and press wheels, very close to the ground and takes the place of the usual seed hoppers with their mechanically driven seed mechanisms in the bottom and the flexible conveying tubes.

Figure 1:
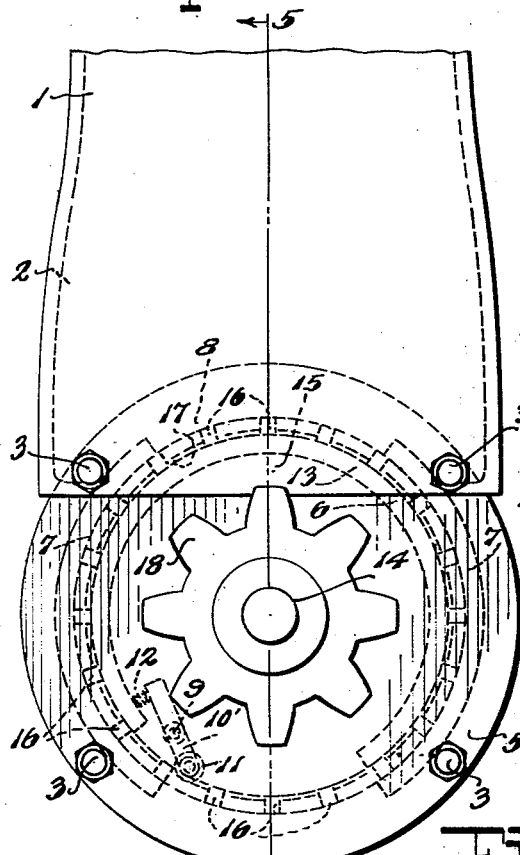
Figure 1 is a side elevation of an embodiment of our invention.
Figure 2:
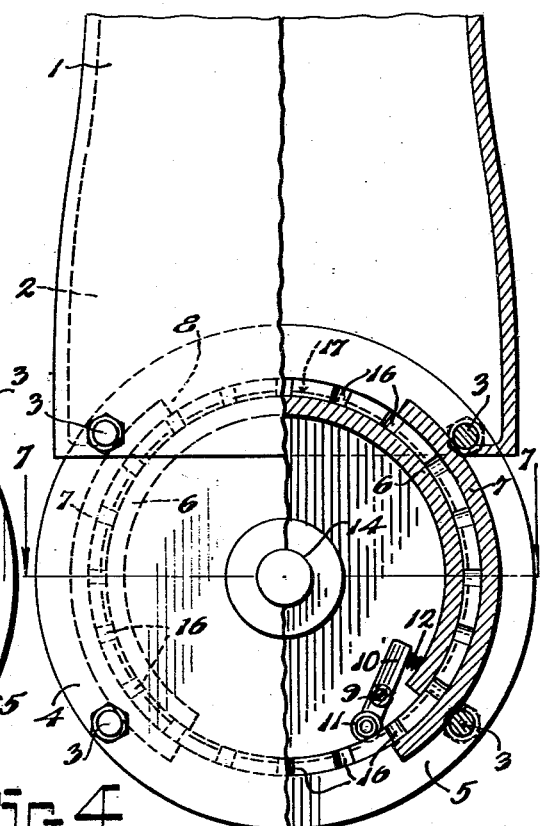
Figure 2 is a similar view of the side opposite to that shown in Figure 1.
Figure 3:
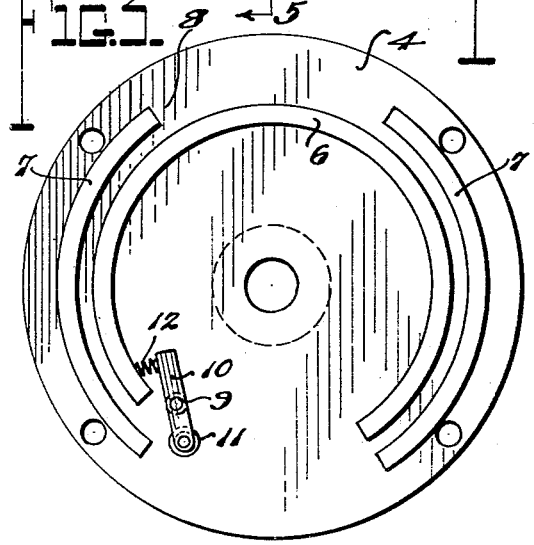
Figure 3 is a side elevation of one of the complemental seed retaining discs used in the device.
Figure 4:
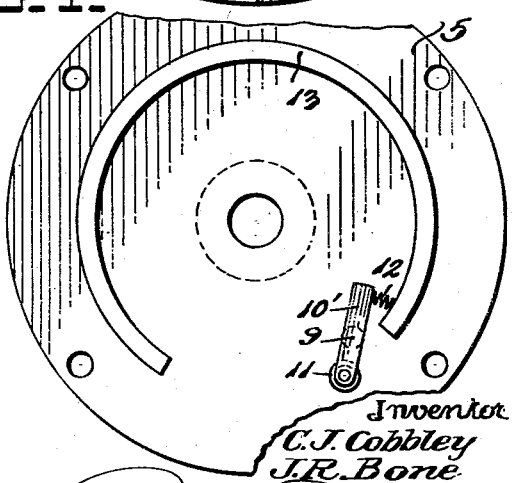
Figure 4 is a similar view of the other retaining disc.

With this understanding, the device comprises the seed hopper 1 in the constricted bottom opening 2 of which is secured, as by means of the bolts 3, a pair of complemental retaining discs or hubs 4, 5. As shown in Figure 3, the disc 4 is provided on its inner face with an inside narrow seed retaining ring or flange 6 and a wide outside concentric retaining ring 7 spaced therefrom and interrupted as indicated at 8, for reasons hereinafter set forth. Both of these rings are interrupted at the bottom and at this lower portion is pivotally mounted on a stud 9 a tripper member 10 having at its free end a beveled wheel 11 and at its other end a tensioning spring 12. As will be noted in Figure 7, the outer wide ring 7 acts as a spacer, contacting with disc 5 in spaced relation to its retaining ring 13 which coincides with the inner ring 6 of disc 4.

In the bottom interruption of ring 13 is mounted a tripper member 10' corresponding in all respects to the tripper member 10, and, therefore, not further described herein.

Between the two discs 4 and 5 and upon the drive shaft 14 is mounted the seed wheel 15 shown in detail in Figure 6. This wheel is provided with a wide rim, each side of which is formed with a row of laterally and radially opening notches 16 constituting pockets to receive single seeds as the wheel rotates with said rim extending between the rings 6—13 and 8. The notches or openings in one row are staggered with respect to the notches in the opposite row and all are uniformly spaced circumferentially. Traversing each row on the inner face of the rim at each side of the wheel is a race 17 to receive the tripper wheel 11.

The shaft 14 carries a sprocket 18 which is driven by a chain (not shown) from any suitable source of power, usually the ground wheels and shaft of the implement.

The operation of the foregoing mechanism may be briefly summarized as follows: The hopper 1 is filled with the seed to be planted, said seed resting upon the feeding means mounted in the hopper bottom. Owing to the interruption 8 in the ring 7 the seed will fill each of the openings 16 of the seed wheel exposed at this point, each of said openings being of a size to accommodate only a single seed. As the wheel 15 is caused to rotate these seeds are carried around between the retaining rings until they reach the bottom interruptions when they fall by gravity or are positively knocked out by the tripper members 10, 10'. It will be noted particularly by reference to Figure 8 of the drawings that owing to the tapered or sharp edge of the wheels 11 of the trippers which operate in the races 17, said wheels actually penetrate into the openings for some distance and this insures the displacement of any seed from the wheel openings 16. So long as the seeds remain in the hopper they are continuously fed and uniformly planted at accurately spaced distances, and when it is desired to change such planting relation, or plant a different seed variety, it is only necessary to substitute the proper seed wheel designed for the particular purpose.

While the specific details of construction have been herein shown and described, the invention is not confined thereto as alterations may be made without departing from the spirit thereof as defined by the appended claims.

Having thus described our invention, what we claim as new and desire to secure by Letters Patent is:

1. A seed planting device comprising a hopper, seeding means in the bottom thereof comprising complemental discs having seed retaining means thereon, a seed wheel cooperating with the retaining means and having a rim provided with circumferentially spaced seed receiving openings therein to carry the seed from the hopper to the base of the seeding means, and having an annular race in the plane of the openings in the rim and a tripper member at said base for dislodging the seed from the seed wheel, said tripper member comprising a roller operable in the race aforesaid.

2. A seed planting device as claimed in claim 1, wherein the annular race is substantially V-shaped in cross-section, and the roller is annularly bevelled complementary to the race.

3. A seed planting device comprising a hopper, seeding means in the bottom thereof, comprising a pair of vertically disposed complemental discs having outer and inner seed retaining rings extending laterally therefrom, one of said rings constituting spacing means for the discs, and a seed wheel having an apertured rim operable between the outer and inner rings, the outer ring being interrupted at the top to allow the seed from the hopper to drop into the apertures of the seed wheel, and said rings being provided with a discharge opening at the base.

4. A seed planting device comprising a hopper, seeding means in the bottom thereof, comprising a pair of vertically disposed complemental discs having outer and inner seed retaining rings extending laterally therefrom, one of said rings constituting spacing means for the discs, a seed wheel having an apertured rim operable between the outer and inner rings, the outer ring being interrupted at the top to allow the seed from the hopper to drop into the apertures of the seed wheel, said rings being provided with a discharge opening at the base, and a tripper member on one of the discs at the discharge opening arranged to move into the rim apertures to dislodge seed therefrom.

5. A seed planting device comprising a hopper, seeding means in the bottom thereof, comprising a pair of vertically disposed complemental discs having outer and inner seed retaining rings extending laterally therefrom, one of said rings constituting spacing means for the discs, a seed wheel having an apertured rim operable between the outer and inner rings, the outer ring being interrupted at the top to allow the seed from the hopper to drop into the apertures of the seed wheel, said rings being provided with a discharge opening at the base, the rim of the seed wheel having an annular race traversing the rim apertures, and a tripper member operable in said race to dislodge seed from said apertures.

CHARLES JOSEPH COBBLEY.
JOHN RICHARD BONE.